United States Patent [19]

Portyrata

[11] 4,102,790
[45] Jul. 25, 1978

[54] FILTER UNDERDRAIN

[75] Inventor: Raymond E. Portyrata, North Haven, Conn.

[73] Assignee: Diaclear, Inc., Hamden, Conn.

[21] Appl. No.: 715,752

[22] Filed: Aug. 18, 1976

[51] Int. Cl.² ............................................. B01D 23/18
[52] U.S. Cl. .................................................. 210/293
[58] Field of Search ............... 210/275, 283, 284, 287, 210/289, 290, 291, 293, 263, 483, 497 R, 497 FB, 498; 261/114 JP, 110, 94, 122; 34/192, 195, 237–239, 241

[56] References Cited

U.S. PATENT DOCUMENTS

| 1,692,592 | 11/1928 | Stickney | 210/293 X |
| 1,828,282 | 10/1931 | Dotterweich | 210/289 X |
| 3,245,540 | 4/1966 | Johnson | 210/497 X |

*Primary Examiner*—William A. Cuchlinski, Jr.
*Attorney, Agent, or Firm*—Albert Sperry; Frederick A. Zoda; John J. Kane

[57] ABSTRACT

An underdrain for use with granular type liquid filtering systems including a plate of an inverted dished configuration having a plurality of laterally facing slots defined therein, the slots being defined by an upper edge and an associated lower edge, the upper edge being positioned almost directly above the lower edge such that the slots face horizontally outward, the slots being positioned upon the dished plate in a spiral array with each slot being formed by shearing of the plate material between two cutting edges positioned above and below the plate, the upper edges presenting downwardly facing arcuate edges and the lower edges presenting upwardly facing arcuate edges to define a slot having opposed facing arcuate sides, the plate may further define a flat horizontally extending imperforate annular center-section within the spiral array of slots and a flat horizontally extending imperforate annular outer-section extending about the spiral array of slots, the center-section may define a central aperture therein.

7 Claims, 5 Drawing Figures

FILTER UNDERDRAIN

BACKGROUND OF THE INVENTION

1. Field Of The Invention

The underdrain of the present invention is designed generally for usage with filtering chambers useful for the filtering and cleaning of liquids, particularly water, by passage of the liquid through a bed of filtering media usually granular as used in swimming pool filters and the like. In most designs the filtering chamber is formed by a filter tank which is partitioned into an upper section which contains the filtering media and a lower section from which the cleaned fluid is returned. These sections are partitioned or separated from one another by the underdrain. The liquid to be cleansed is supplied to the top of the filtering media and passes downwardly by the force of gravity and/or by pumping through the filtering media which cleans the liquid. The liquid then passes through the perforated underdrain into the lower section. The holes or apertures within the underdrain must be small enough to prevent the passage of the particularly chosen filtering media but large enough to admit freely the passage of the liquid therethrough.

Such filtering systems must also provide a means for cleaning of the filtering media without withdrawing the filtering media from the filter tank. The usual process is a backwashing of a cleaning liquid through the filtering system in the reverse direction with respect to the normal direction of flow for filtering.

2. Description Of The Prior Art

One example of an underdrain configuration useful with the filtering devices of the present field of art is U.S. Pat. No. 3,519,135 issued July 7, 1970. In this patent a perforated underdrain is utilized in which the apertures within the underdrain plate are chosen with a vertically extending pronged structure such that during backwashing the fluid is directed upwardly in a jetting action to aid in the freeing of dirt and other substances which have been accumulated during the immediately previous period of filtering operation. Other U.S. patents showing similar construction for particulate material filtering include U.S. Pat. Nos. 3,142,642 and 3,625,365. These designs include various pipes, arms and apertured devices for providing full filtering of the liquid while still providing a convenient means of backwashing the filter tank.

The present apparatus provides a unique design which overcomes many of the problems of the prior art since the backwashing water is directed outwardly toward the walls of the filter tank by the novel configuration of the slots within the filter underdrain. This advantage and further advantages of the present invention will be apparent from a review of the disclosure.

SUMMARY OF THE INVENTION

The present invention comprises an underdrain for use with filtering systems having granular filtering media. The underdrain may be chosen in the form of a plate having an inverted dished configuration with the concave surface thereof facing downwardly. The plate may define a plurality of laterally facing slots therein which are defined by a plurality of pairs of upper and associated lower edges such that the liquid to be filtered may flow through the underdrain plate whereas the filtering media will be held within the filtering tank thereabove.

The underdrain of the present invention is adapted to be placed in a filtering tank with the filtering media held entirely thereabove whereas, prior art filters having various configurations such as slotted pipes and the like only supporting a portion of the media. The intake of liquid to be filtered will be at the top of the tank while the means for collecting filtered liquid will be located near the bottom of the tank below the underdrain. The slots in the underdrain plate are formed by shearing in the vertical plane such that the sheared edges which form the sides of the slots will be positioned vertically above each other. In other words, the aperture formed by the slot will extend solely in the vertical plane and will have little if any horizontal component. In this configuration backwashing action is greatly improved by a toroidal flow action created by the outwardly directed apertures.

During a backwashing operation fluid is passed through the filtering media in a direction reverse with respect to the direction of filtering. With designs heretofore the apertures in the underdrain plate allowed channels to develop through the filtering media such that the backwashing fluid was of minimal use in cleansing the granular filtering media substance. Also, a "dead sand area" was developed around the walls of the tank which was not cleaned due to flow of the backwashing liquid vertically solely through the channels which allowed the accumulation of dirt and debris in the media even after the backwashing operation.

One of the objects of the present invention is the full cleansing of all sand or other filtering media within the filter tank during a single backwashing operation. This complete backwashing operation is achieved by the orientation of the slots within the underdrain plate facing outwardly toward the walls of the filter tank away from the axis or center of the underdrain plate itself. In this manner backwashing fluid will be urged to flow toward the walls and upward along the walls in a toroidal motion such that a thorough mixing of the filtering media will occur. Another advantage of this design will be the thorough mixing of the sand or other filtering media above the underdrain to thereby fully homogenize the larger and smaller media particles to facilitate subsequent filtering operations and to aid in filtering variously shaped and configured debris when operating in the filtering mode.

In order to aid in manufacture, the slots may be formed in the underdrain plate in a spiral array. However it should be appreciated that any design of laterally extending slots would be able to achieve the advantages of the present invention and therefore are anticipated herein.

The underdrain plate may include a flat horizontal imperforate annular center-section which defines a central aperture therethrough to facilitate mounting of the underdrain within the filtering tank and to allow use of the underdrain plate with systems having a central flow conduit. Also the present invention may include a flat horizontal imperforate annular outer section to aid in mounting or handling of the underdrain plates.

It is an object of the present invention to provide a filter underdrain which suspends filtering media thereabove while allowing full liquid flow therethrough.

It is an object of the present invention to provide a filter underdrain which when operated in a backwashing mode cleans all of the filtering media located thereabove since a large percentage of the filtering media is directly supported by the slotted surface of the underdrain.

It is an object of the present invention to provide a filter underdrain which is sturdy in construction and can withstand high operating temperatures.

It is an object of the present invention to provide a filter underdrain which is strong enough to resist the development of high internal pressures within filtering systems.

It is an object of the present invention to provide a filter underdrain system which is less prone to stoppage and breakage caused by corrosion of other underdrains having different configurations and formed from different materials.

It is an object of the present invention to provide a filter underdrain system which homogenizes the filtering bed thereabove during backwashing operations.

It is an object of the present invention to provide a filter underdrain which prevents channeling of the filtering media during backwashing operations.

It is an object of the present invention to provide a filter underdrain which allows a low pressure drop thereacross because of uniformity in slotted openings.

It is an object of the present invention to provide a filter underdrain which prevents the by-pass of sand because of the uniformity of slot openings.

It is an object of the present invention to provide a filter underdrain which is easy to manufacture and inexpensive to manufacture.

It is an object of the present invention to provide a filter underdrain requiring little maintenance thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
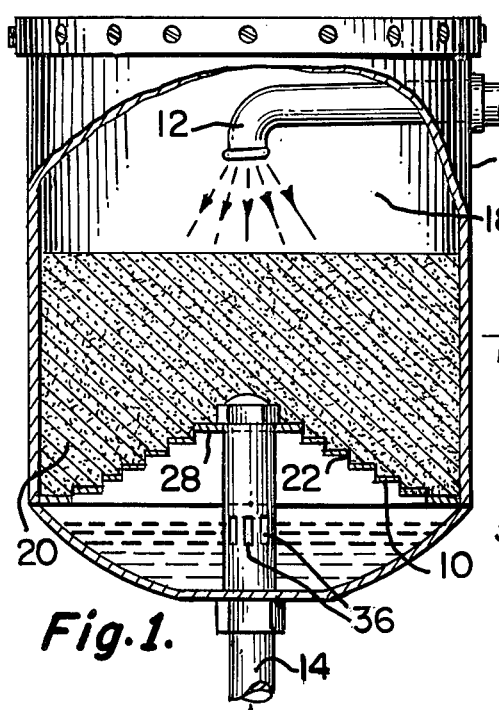
FIG. 1 is a side plan view of an embodiment of the present invention showing placement within a filtering apparatus.
Figure 2:
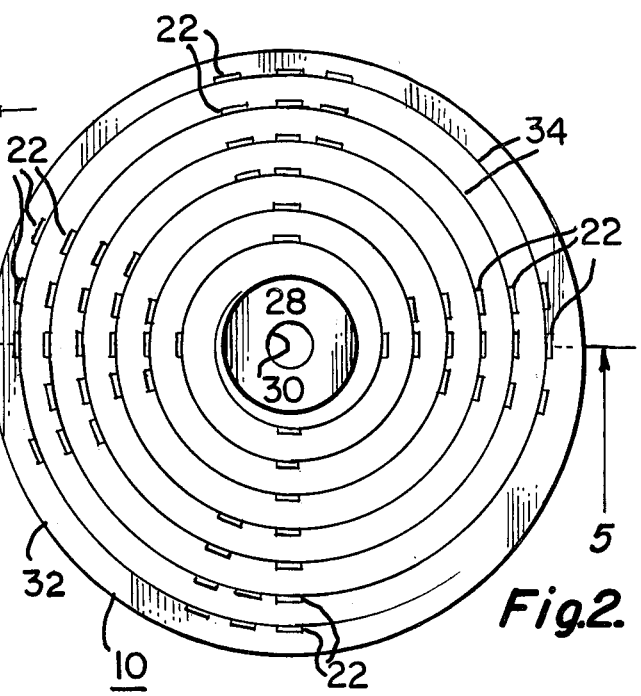
FIG. 2 is a top schematic view of an embodiment of the underdrain of the present invention.
Figure 3:
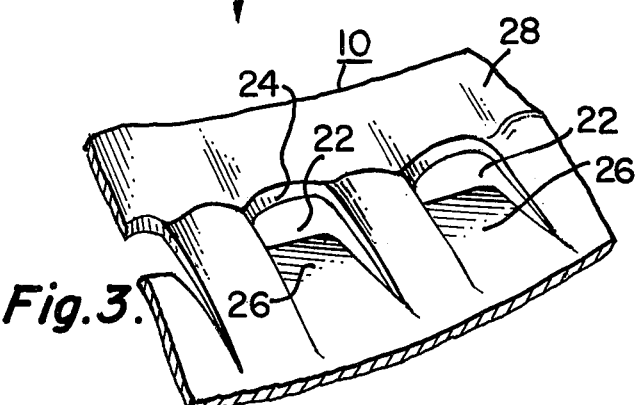
FIG. 3 is a perspective view of an embodiment of the slots of the present invention.

A preferred embodiment of the present invention may include a downwardly facing concave circular underdrain 10 which is positioned within a filter tank 16. The underdrain 10 provides a lower support means for holding the filtering medium 20 such as sand or the like thereabove within the filtering chamber 18 defined by tank 16.

In one embodiment a liquid supply 12 may extend into the upper portion of chamber 18 and a liquid return 14 may extend within the lower area of tank 16. With this configuration liquid to be filtered passes through supply 12 into chamber 18. This liquid then flows through the filtering media 20 which collects debris and contaminants therefrom. This filtered liquid now passes through the slots 22 defined within underdrain 10 and is collected by liquid return 14 by passing through the orifices 36.

Each of slots 22 is defined by an upper edge 24 and a lower edge 26. Preferably upper edge 24 is positioned approximately directly above lower edge 26 such that the aperture opening of slot 22 extends laterally and is defined almost solely within a vertical plane. The upper edge 24 is preferably of a arcuate vertical cross-section facing downwardly or outwardly and the lower edge 26 is preferably of an upwardly facing slightly arcuate cross-section to define the slot 22 therebetween as a long narrow slot extending laterally.

The underdrain 10 of the present invention may include a flat horizontal imperforate annular cross-section 28 which may define a central aperture 30 therethrough to facilitate mounting of the underdrain within the filter tank 16 or to facilitate usage of the underdrain 10 with commonly used filtering systems having a central conduit extending vertically therethrough. The underdrain 10 may also include a flat horizontal imperforate annular outer-section 32 which extends about the periphery of the underdrain to provide support to the edges thereto and facilitate handling thereof. Extending between the center-section 28 and the outer-section 32 the slots 22 may be configured in a spiral array or a plurality of circular arrays to facilitate backwashing and filtering operations.

Figure 4:
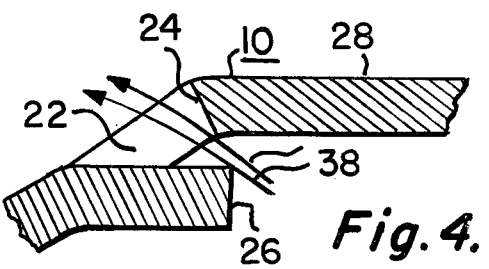
FIG. 4 is a side cross-sectional view of an embodiment of the present invention showing in detail the flow of backwashing fluid through slots.
Figure 5:
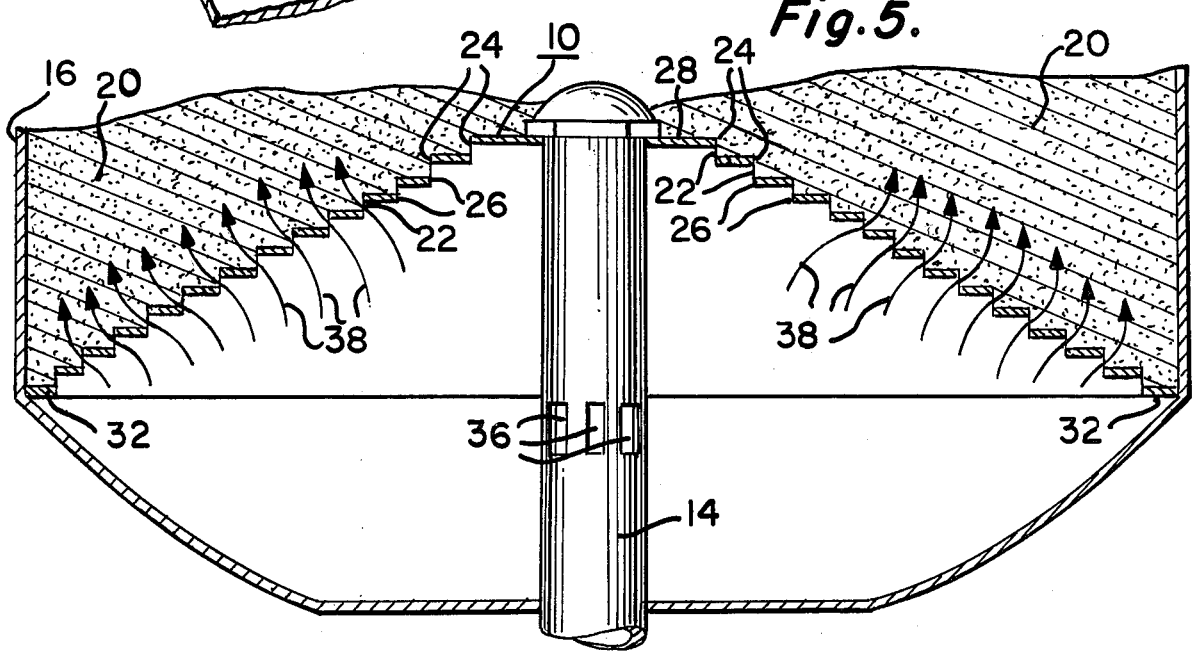
FIG. 5 is a side cross-sectional view of an embodiment of the underdrain of the present invention in place within a filtering apparatus.

The embodiment shown in FIG. 1 illustrates the particular advantages of the present design when operating in the backwashing mode. With such filtering systems it is desirable to periodically backwash the system to cleanse the filtering media 20. During this operation backwashing fluid is supplied through liquid return 14 to pass through orifices 36. This backwashing fluid then passes upwardly through slots 22 to pass vertically upward through the filtering media 20. With prior art designs this backwashing has often resulted in the forming of channels which provide the least resistent vertical flow path for the backwashing fluid which greatly minimizes the cleansing effect of the backwashing operation. The present design utilizes particular configurations for slots 22 in which the upper edges 24 are positioned approximately directly above the lower edges 26 and face outwardly. This outward facing is achieved by the upper edge 24 being positioned directly above the lower edge 26 in the downwardly facing concave configuration. In this configuration the backwashing fluid flows as shown by arrows 38 in FIGS. 4 and 5. As the backwashing fluid flows upward and through slots 22 it is guided to flow in an outward direction toward the walls of the filtering tank 16 and then upward along the walls. In this manner the "dead sand area" which has heretofore existed adjacent the interior walls of the filter tanks is eliminated. The filtering media 20 is thoroughly mixed by this lateral backwashing flow which fully homogenizes the variety of granular sizes existent within the filtering media 20 while also cleaning all of the filtering media. A homogeneous media 20 is desirable in order to aid in fully filtering all types and sizes of contaminants existing within the fluid to be filtered.

The slots 22 of the underdrain 10 may be formed by shearing of the virgin plate in a vertical plane. In order to aid in manufacture it may be desirable to form the slots one at a time and in this manner a spiral array of such slots may occur. This spiral array of slots is desirable since a lower fluid pressure drop will therfore exist across the underdrain plate 10 due to the uniformity of slot openings. This uniformity of slot openings also prevents by-pass of filtering media therethrough. Prior art designs have overcome this filtering media by-pass problem by holding the filtering media within a radial array of arms which contain the filtering media therein. Water to be filtered passes into the center of the array through the media and passes to the collector through apertures in the radial arms. Such a system does not have the advantages of the present design since all the media is not supported by the underdrain. The present design has advantages over that system since the uniformity of slot configuration allows the entire filtering media 20 to be placed directly upon the underdrain 10 and therefore there is less of a pressure drop across the underdrain while at the same time filtering media by-pass is prevented. This combination of purposes, as well as the advantages of backwashing through a sand bed or filtering bed which is fully supported by the underdrain, has not been shown heretofore in the prior art.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A filter underdrain especially for use with a granular filtering medium comprising:
   (a) a plate having an inverted dished configuration, said plate defining a plurality of laterally facing slots arranged individually in a horizontally extending spiral array therein; and
   (b) a plurality of upper edges and associated lower edges, each said upper edge and said lower edge cooperating to define one of said slots, said upper edges being positioned approximately directly above said associated lower edge to face said slot laterally horizontally outward from the center of said plate in order to impart a turbulent mixing action to a granular filtering medium during backwashing.

2. The underdrain as defined in claim 1 wherein said slots are defined solely in the vertical plane.

3. The underdrain as defined in claim 1 wherein said plate is of stainless steel.

4. The underdrain as defined in claim 1 further comprising a flat horizontal imperforate annular center-section which defines a central aperture therethrough.

5. The underdrain as defined in claim 1 further comprising a flat horizontal imperforate annular outer-section.

6. The underdrain as defined in claim 1 wherein said upper edge presents a downwardly facing slightly arcuate vertical cross-section and said lower edges presents an upwardly facing slightly arcuate vertical cross-section to define said laterally facing slots.

7. A filter underdrain especially for use with a granular filtering medium comprising:
   (a) a plate having an inverted dished configuration, said plate defining a plurality of outwardly facing slots arranged individually in a horizontally extending spiral array therein, said plate defining a central aperture therethrough;
   (b) a plurality of upper edges and associated lower edges, each said upper edge and said lower edge defining one of said slots, said upper edges being positioned directly above said associated lower edges to face said slots laterally outward from said plate in order to impart a turbulent mixing action to a granular filtering medium during backwashing;
   (c) a flat imperforate annular center-section extending about said central aperture; and
   (d) a flat imperforate annular outer-section extending about the spiral array of said slots.

* * * * *